United States Patent
Thubert et al.

(10) Patent No.: US 7,551,632 B2
(45) Date of Patent: *Jun. 23, 2009

(54) ARRANGEMENT FOR TRAVERSING AN IPV4 NETWORK BY IPV6 MOBILE ROUTERS

(75) Inventors: Pascal Thubert, La Colle sur Loup (FR); Marco Molteni, Antibes (FR); Patrick Wetterwald, Cagnes sur Mer (FR); Ole Troan, St. Annes Rise (GB)

(73) Assignee: Cisco Technology, Inc., San Jose, CA (US)

( * ) Notice: Subject to any disclaimer, the term of this patent is extended or adjusted under 35 U.S.C. 154(b) by 528 days.

This patent is subject to a terminal disclaimer.

(21) Appl. No.: 11/337,660

(22) Filed: Jan. 24, 2006

(65) Prior Publication Data

US 2006/0120382 A1 Jun. 8, 2006

Related U.S. Application Data

(63) Continuation of application No. 10/383,567, filed on Mar. 10, 2003, now Pat. No. 7,031,328.

(51) Int. Cl.
*H04L 12/28* (2006.01)
*H04L 12/56* (2006.01)

(52) U.S. Cl. .................... 370/401; 370/466

(58) Field of Classification Search ............ 370/401, 370/466, 328, 329, 338, 352, 395.5, 395.52, 370/400, 465, 353; 709/227, 245
See application file for complete search history.

(56) References Cited

U.S. PATENT DOCUMENTS

| 6,172,986 | B1 * | 1/2001 | Watanuki et al. ........... 370/466 |
| 6,865,184 | B2 * | 3/2005 | Thubert et al. ............. 370/401 |
| 7,031,328 | B2 * | 4/2006 | Thubert et al. ............. 370/401 |
| 2001/0040895 | A1 * | 11/2001 | Templin .................... 370/466 |
| 2002/0073215 | A1 * | 6/2002 | Huitema et al. ............. 709/230 |
| 2004/0013130 | A1 * | 1/2004 | Blanchet et al. ............. 370/466 |
| 2004/0088385 | A1 * | 5/2004 | Blanchet et al. ............. 709/220 |
| 2004/0117339 | A1 | 6/2004 | Thubert et al. |
| 2004/0133692 | A1 * | 7/2004 | Blanchet et al. ............. 709/230 |
| 2004/0148428 | A1 * | 7/2004 | Tsirtsis .................... 709/238 |

OTHER PUBLICATIONS

IPv4 traversal for MIPv6 based Mobile Router, Feb. 2003, P. Thubert et al.*

(Continued)

*Primary Examiner*—Edan Orgad
*Assistant Examiner*—Chuong T Ho
(74) *Attorney, Agent, or Firm*—Leon R. Turkevich

(57) ABSTRACT

A source IPv6 mobile router is configured for establishing an IPv4 tunnel with destination IPv6 mobile router using a synthetic tag address, specifying a forwarding protocol, and IPv4 source and destination addresses. If an optional transport header is used (e.g, UDP port), the source port and destination port also are added to the synthetic tag address. The IPv6 packet includes a reverse routing header that enables the destination IPv6 mobile router to recover routing information for reaching the source IPv6 mobile router via the IPv4 network. Hence, all IPv4 routing information that may be needed by the destination IPv6 mobile router in sending an IPv6 reply packet back to the source IPv6 mobile router is maintained in the routing header specified in the IPv6 reply packet.

25 Claims, 6 Drawing Sheets

OTHER PUBLICATIONS

Johnson et al., "Mobility Support in IPv6", Internet Draft, IETF Mobile IP Working Group, draft-ietf-mobileip-ipv6-20.txt, Jan. 20, 2003.

Deering et al., "Internet Protocol, Version 6 (IPv6)", Request for Comments: 2460, IETF Network Working Group, Specification, Dec. 1998.

Huitema, "Teredo: Tunneling IPv6 over UDP through NAT's", IETF Internet Draft, draft-ietf-ngtrans-shipworm-08.txt, Sep. 17, 2002.

Carpenter et al., "Connection of IPv6 Domains via IPv4 Clouds", IETF Network Working Group, Request for Comments: 3056, Feb. 2001.

Thubert et al., "IPv6 Reverse Routing Header and its application to Mobile Networks", IETF Network Working Group, Internet-Draft, draft-thubert-nemo-reverse-routing-header-01, Oct. 11, 2002.

Thubert et al., "IPv6 Reverse Routing Header and its application to Mobile Networks", IETF Network Working Group, Internet-Draft, draft-thubert-nemo-reverse-routing-header-00, Jun. 19, 2002.

Soliman et al., Hierarchical MIPv6 mobility management (HMIPv6), IETF Mobile IP Working Group, Internet-Draft, draft-ietf-mobileip-hmipv6-06.txt, Jul. 2002.

Thubert et al., "IPv4 traversal for MIPv6 based Mobile Routers", IETF Network Working Group, Internet-Draft, draft-thubert-nemo-ipv4-traversal-00, Feb. 2003.

* cited by examiner

Figure 3A

| "Up" Protocol ID | Src. IPv4 (Private) | Door IPv4 Addr (Pub.) | Src. UDP (Prv.) | Pub. Door UDP Port |
|---|---|---|---|---|
| 12.34.56.78 | 10.1.1.2 | 210.0.2.2 | XX | 434 |

1st 3 MSB = "000"

Figure 3B

| "Down" Protocol ID | Src. IPv4 (Public) | Door IPv4 Addr (Pub.) | Src. UDP (Pub.) | Pub. Door UDP Port |
|---|---|---|---|---|
| 12.34.32.10 | 66.88.1.2 | 210.0.2.2 | YY | 434 |

1st 3 MSB = "000"

Figure 4

IPv6 Packet

| Src IPv4 | Door IPv4 | Src UDP | Dest UDP | S=MR2_TAG1 | D=MR2_HA | RRH | Payload |
|---|---|---|---|---|---|---|---|
| 10.1.1.2 | 210.0.2.2 | XX | 434 | | | | |

Via NAT →

IPv6 Packet

| Src IPv4 | Door IPv4 | Src UDP | Dest UDP |
|---|---|---|---|
| 66.88.1.2 | 210.0.2.2 | YY | 434 |

ARRANGEMENT FOR TRAVERSING AN IPV4 NETWORK BY IPV6 MOBILE ROUTERS

This application is a continuation of application Ser. No. 10/383,567, filed Mar. 10, 2003 and issued as U.S. Pat. No. 7,031,328.

BACKGROUND OF THE INVENTION

1. Field of the Invention

The present invention relates to transport of Internet Protocol Version 6 (IPv6) packets by IPv6 nodes via an IPv4 network having a Network Address Translator (NAT) or a Port Address Translator (PAT).

2. Description of the Related Art

Proposals are underway by the Next Generation Transition (NGTRANS) Working Group of the Internet Engineering Task Force (IETF) to enable network nodes to transmit IP packets, generated according to IPv6 protocol as specified by the Request for Comments (RFC) 2460, across an IPv4 network. In particular, RFC 3056 proposes an interim solution (referred to herein as "the 6to4 proposal") of sending IPv6 packets as payload for IPv4 packets, where an interim unique IPv6 address prefix is assigned to any node that has at least one globally unique IPv4 address. These RFCs are available at the IETF website on the World Wide Web at http://www.ietf.org The 6to4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address.

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6to4 mechanism" in order for the 6to4 proposal to still be operable in the IPv4 network having the NAT. However, the modification of existing NATs to include IPv6 routers to include the 6to 4mechanism may not be a practical solution.

Further, the IPv4 addresses of the 6to4 protocol are assumed to be global public addresses. Hence, if an IPv6 node (i.e., a correspondent node) wants to communicate with a roaming mobile IPv6 node, the 6to4 address of the roaming mobile IPv6 node must be a global public address, not a private address.

One proposal for traversing a NAT by an IPv6 node using automatic tunneling is described in an IETF Draft by Huitema, entitled "Teredo: Tunneling IPv6 over UDP through NATs", Sep. 17, 2002, available on the World Wide Web at the address: http://www.ietforg/internet-drafts/draft-ietf-ngtrans-shipworm-08.txt.

Huitema suggests that IPv6 nodes located behind NATs can access "Teredo servers" and "Teredo relays" to learn their "global address" and to obtain connectivity, where clients, servers, and relays can be organized in "Teredo networks". Huitema relies on a complex client server-based interaction between the client (i.e., the IPv6 node) behind the NAT in the private IPv4 address realm, and the Teredo server and Teredo relay on the opposite side of the NAT in the public IPv4 address realm. Hence, the communications between the IPv6 node on the private side of the NAT, and the Teredo server and the Teredo relay on the public side of the NAT, (via the NAT), require that the IPv6 node has a specified path to both the Teredo server and the Teredo relay gateway on the public side; hence, the IPv6 node needs to use the same IPv4 identifier (e.g., UDP port IP address that is being translated by the NAT).

This same IPv4 identifier for communications with the Teredo server and Teredo relay, however, is impossible with symmetric NATs because the Teredo server and Teredo relay each have a distinct corresponding IPv4 public address. In particular, symmetric NATs index their address translation tables not only by private IP address/private UDP port/public IP address/public UDP port of the packet output by a private IPv4 node, but also by the destination IP address and destination port specified by the packet and destined for the public IPv4 network. Hence, since the Teredo server and Teredo relay have distinct IP addresses, the symmetric NAT will not map the packets to the same private IP address/private UDP port used by the private IPv4 node. Hence, the Huitema solution cannot traverse a symmetric NAT.

SUMMARY OF THE INVENTION

There is a need for an arrangement that enables IPv6 nodes to communicate transparently across an IPv4 network, regardless of whether the IPv6 nodes are separated across the IPv4 network by a symmetrical NAT.

There also is a need for an arrangement that enables IPv6 nodes to transport IPv6 packets across an IPv4 network, without the necessity of each IPv6 node serving as an IPv4 endpoint to store state information.

There also is a need for an arrangement that enables IPv4 tunnels to be established across a NAT by IPv6 gateways in a manner that minimizes use of NAT resources.

These and other needs are attained by the present invention, where a source IPv6 mobile router is configured for establishing an IPv4 tunnel with destination IPv6 mobile router using a synthetic tag address, specifying a forwarding protocol, and a reverse routing header that enables the destination IPv6 mobile router to recover routing information for reaching the source IPv6 mobile router via the IPv4 network. Hence, all IPv4 routing information that may be needed by the destination IPv6 mobile router in sending a reply back to the source IPv6 mobile router is maintained in the routing header specified in the reply. Hence, IPv6 packets may be transported via an IPv4 network, regardless of whether the IPv4 network includes a NAT that separates the source and destination IPV6 mobile routers.

One aspect of the present invention provides method in an IPv6 mobile router. The method includes generating an IPv6 tag address that includes a prescribed protocol identifier for an IPv6 gateway configured for transferring packets between an IPv4 network and an IPv6 network, and a public IPv4 gateway address for the IPv6 gateway. The method also includes generating an IPv6 packet having a source address field that specifies the IPv6 tag address, and a reverse routing header that specifies a home address. The method also includes encapsulating the IPv6 packet in an IPv4 packet having an IPv4 header including a destination address field that specifies the public gateway IPv4 address and a source address field specifying a mobile router IPv4 address, the mobile router IPv4 address used by the IPv6 mobile router for accessing the IPv6 gateway via the IPv4 network. The IPv4 packet is output to the IPv6 gateway via the IPv4 network, for transfer of the IPv6 packet onto the IPv6 network.

Another aspect of the present invention provides a method in an IPv6 mobile router. The method includes attaching to a public IPv4 network using a public IPv4 gateway address and an IPv6 network using an IPv6 address, and receiving from the public IPv4 network an IPv4 packet having a destination address specifying the public IPv4 gateway address, a destination port field specifying a prescribed public gateway port, a source address field specifying a pubic IPv4 address and a source port field specifying a public port. The method also includes recovering an IPv6 packet from the IPv4 packet in response to detecting the prescribed public gateway port in the destination port field. The method also includes modifying a detected IPv6 tag address in a source address field of the IPv6 packet into a modified IPv6 tag address in response to detecting a prescribed protocol identifer for an IPv6 gateway to transfer the IPv6 packet from the IPv4 network to the IPv6 network, the modifying including replacing the prescribed protocol identifer with a second protocol identifer, and inserting the pubic IPv4 address and the public port. The method also includes updating the IPv6 packet into an updated IPv6 packet by inserting the modified IPv6 tag address into a detected reverse routing header of the IPv6 packet, and inserting a care-of address for the mobile router into the sorce address field, and outputting the updated IPv6 packet onto the IPv6 network Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 3A and 3B are diagrams illustrating IPv6 tag addresses generated by the IPv6 source and destination mobile routers serving as the IPv4 tunnel endpoints of FIG. 1, respectively.

FIG. 4 is a diagram illustrating an IPv4 packet, output by the source mobile router of FIG. 1 and carrying an IPv6 packet, that encounters address translation by a NAT/PAT.

BEST MODE FOR CARRYING OUT THE INVENTION

The disclosed embodiment is directed to tunneling IPv6 packets across an IPv4 network based on use of IPv6 based reverse routing headers. The generation and use of reverse routing headers was published on Jun. 19, 2002 by the inventors as an Internet Draft, "IPv6 Reverse Routing Header and its application to Mobile Networks" available on the World Wide Web http://www.ietf org/internet-drafts/draft-thubert-nemo-reverse-routing-header-00.txt and is incorporated in its entirety herein by reference. A more recent version was published Oct. 11, 2002, available on the World Wide Web at http://www.ietforg/internet-drafts/draft-thubert-nemo-reverse-routing-header-1.txt and incorporated in its entirety herein by reference.

Figure 1:
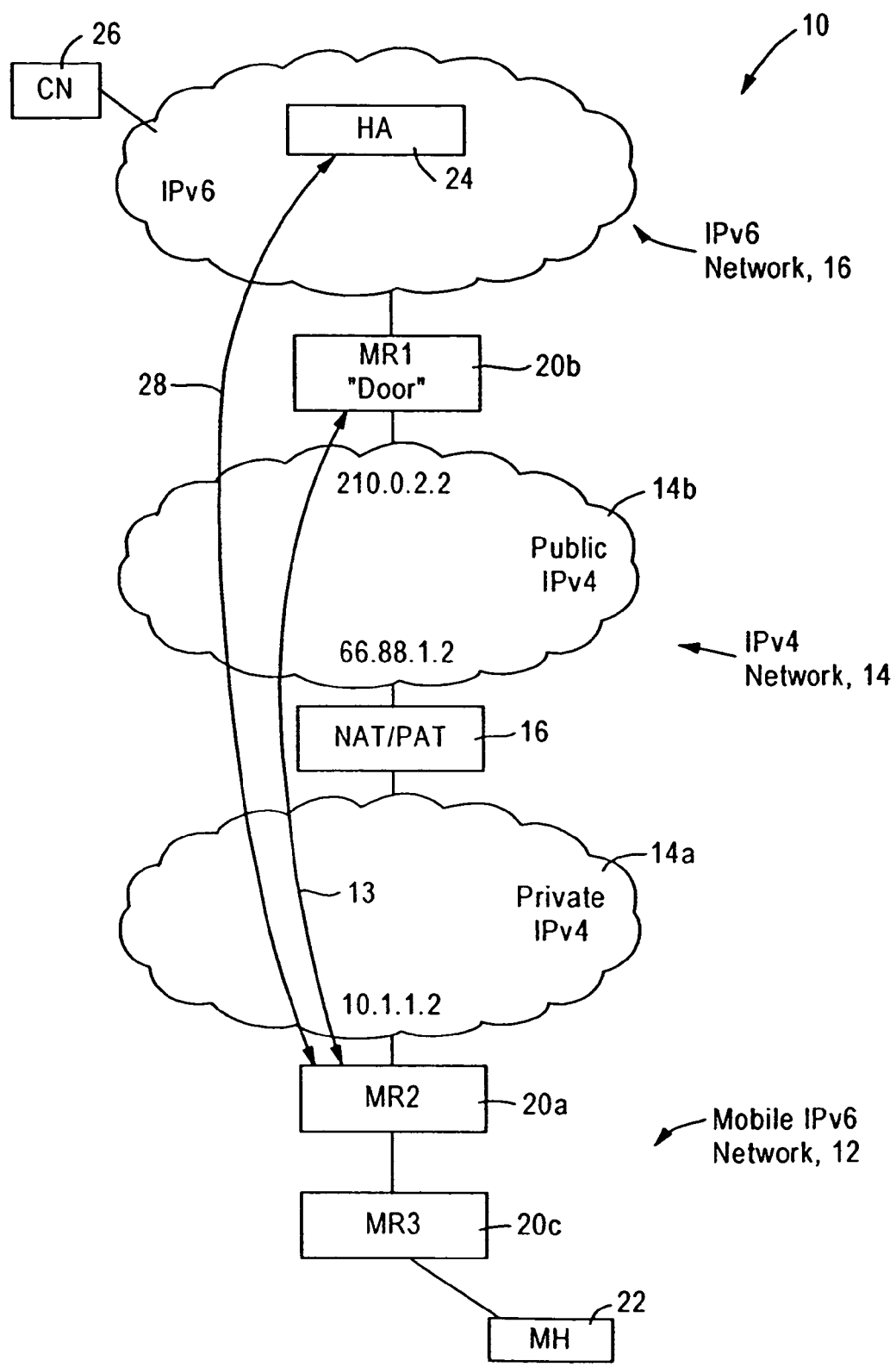
FIG. 1 is a diagram illustrating IPv6 mobile routers establishing an IPv4 tunnel across an IPv4 network utilizing a network address translator (NAT), according to an embodiment of the present invention.

FIG. 1 is a diagram illustrating a network 10, where a mobile IPv6 network 12 is configured for establishing an IPv4 tunnel 13 across an IPv4 network 14 to a destination IPv6 network 16. In particular, the mobile network 12 includes at least a mobile router (MR) 20a configured for sending and receiving packets according to IPv6 protocol. The mobile router 20a also is configured for communications with a corresponding home agent (HA) 24 configured for forwarding packets, addressed to the mobile router home address, to the mobile router 20a's care of address (CoA), according to Mobile IP Protocol as described in an IETF Draft by Johnson et al., entitled "Mobility Support in IPv6", Jan. 20, 2003, available on the World Wide Web at http://www.ietf.org/internet-drafts/draft-ietf-mobileip-ipv6-20.txt (the disclosure of which is incorporated in its entirety herein by reference).

The mobile router 20a ("MR2") may roam as a single roaming mobile router, or may be the top-level mobile router (TLMR) of a mobile network 12 having attached IPv6 nodes. As illustrated in FIG. 1, the mobile router 20a serves as a TLMR in the mobile network 12 for a mobile router 20c ("MR3") and a mobile host (MH) 22.

The mobile router 20a is configured for establishing a bidirectional tunnel 28 with its corresponding home agent (HA) 24, enabling packets sent to the home address of the mobile router 20a (e.g., by a correspondent node (CN) 26) to be forwarded by the home agent 24 to the care of address for the mobile router 20a.

Since the source mobile router 20a is attached to an IPv4 network 14, as opposed to an IPv6 router, the source mobile router 20a also is configured for establishing an IPv4 tunnel 13 (e.g., a UDP tunnel) with a corresponding IPv6 destination mobile router ("MR1") 20b, referred to herein as a "door" mobile router or an IPv6 gateway, having a connection on the IPv4 network 14. Hence, the mobile router 20a is configured for implementing the bidirectional tunnel 28 with its corresponding home agent 24 via the IPv4 tunnel 13, using the door mobile router 20b as a hop in the bidirectional IPv6 tunnel 28 and as an endpoint in the IPv4 tunnel 13.

The IPv4 network 14 may optionally include a Network Addres Translator (NAT) and/or a Port Address Translator (PAT) 16. As illustrated in FIG. 1, the mobile router 20a is attached to a private IPv4 network 14a: the mobile router 20a may obtain its IPv4 address (e.g., "10.1.1.2") based on a prior configuration (static or unnumbered), Dynamic Host Configuration Protocol (DHCP), or IP Control Protocol (IPCP) for Point-to-Point protocol (PPP) links. The private IPv4 network 14a has access to the network address translator (NAT) 16 having a Port Address Translator (PAT) to enable nodes in the private network 14a to be addressable in the public IPv4 network 14b.

The mobile router 20a also is configured to access the door mobile router 20b at a predetermined IPv4 address (e.g., "210.0.2.2"), and a prescribed door port (e.g., UDP port "434") enabling the mobile router 20a to establish the IPv4 tunnel 13 with the door mobile router 20b without the necessity of any discovery protocols. Note that the mobile router 20a may be configured to store a plurality of door IPv4 addresses for multiple door mobile routers, in which case the mobile router 20a could be configured to locate an optimum door mobile router.

As described above, a problem with establishing an IPv4 tunnel traversing the NAT/PAT 16 is that symmetric NATs 16 index their address translation tables not only by private IP address/private UDP port/public IP address/public UDP port of the packet being translated for a private IPv4 node (in this case the mobile router 20a), but also by the destination IP address and destination port for an ingress packet from the public IPv4 network to the door mobile router 20b.

According to the disclosed embodiment, the mobile router 20a is configured for initiating the bidirectional IPv4 tunnel 13 using the same source/destination IPv4 address pair, ensuring that the IPv4 tunnel endpoints 20a and 20b remain the same. Since the endpoints remain the same, the bidirectional IPv4 tunnel 13 can be reliably maintained across the NAT 16 for multiple IPv6 data streams.

Further, the mobile router 20a utilizes a reverse routing header to ensure that all necessary routing information is supplied to the door mobile router 20b and the home agent 24, including a synthesized care of address. As described below with respect to FIG. 3A, the mobile router 20a is configured for generating in IPv6 tag address 30 that includes a prescribed protocol identifier 32: the protocol identifier 32 is used by the IPv6 gateway 20b to identify that the IPv6 packet 30, received via the IPv4 network 14, is to be transferred to the IPv6 network 16.

Figure 2:
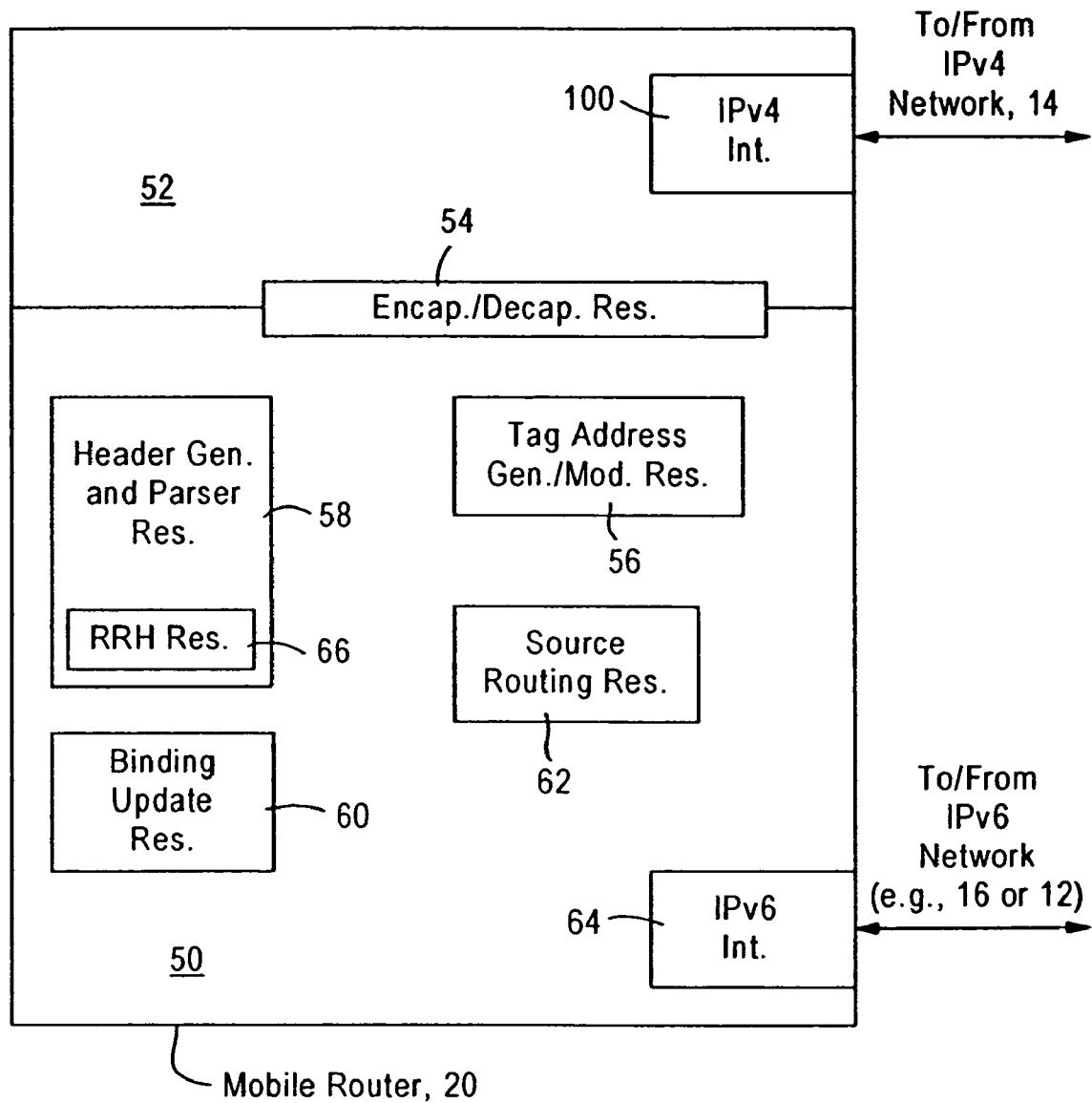
FIG. 2 is a diagram illustrating in further detail the mobile routers of FIG. 1, according to an embodiment of the present invention.

FIG. 2 is a block diagram illustrating a mobile router 20 (e.g., 20a, 20b, or 20c) configured for sending packets according to mobile IPv6 protocol, as well as serving as an endpoint for an IPv4 tunnel 13. The mobile router 20 includes an IPv6 portion 50, an IPv4 portion 52, and an encapsulation/decapsulation resource 54.

The IPv6 portion 50 includes a tag address generation/modification resource 56, an IPv6 header generation and parser resource 58, a binding update resource 60, a source routing resource 62, and an IPv6 interface 64. The tag address generation/modification resource 56 is configured for generating the IPv6 tag address 30, illustrated in FIG. 3A, when the mobile router 20 is acting as a mobile router 20a initiating a connection to an IPv6 gateway mobile router 20b via an IPv4 network 14. In particular, the tag address generation/modification resource 56 is configured for generating an IPv6 tag address 30 that includes a prescribed protocol identifier 32, a source IPv4 address 34 of the mobile router 20a, a public IPv4 gateway address 36 (e.g., "210.0.2.2") for the IPv6 gateway 20b, a source UDP port 38, and a prescribed public UDP port 40 for the IPv6 gateway 20b. The source IPv4 address 34 and the source UDP address 38 may be private addresses and ports, based on connecting to the private IPv4 network 14a. As described above, the public IPv4 gateway address 36 and the prescribed public UDP gateway port 40 are known by the mobile router 20a upon attachment to the network 14. If no transport layer header is used in the IPv4 tunnel 13 (e.g.,. in the case where the NAT 16 does not include a PAT), then the values 38 and 40 are set to zero.

The protocol identifier 32 (e.g., 12.34.56.78) is used by the door mobile router 20b to identify the protocol, namely forwarding the IPv6 packet "up" to the home agent 24 via the IPv6 network 16. In order to ensure that the IPv6 tag address 30 is not misinterpreted as an actual IPv6 address, the tag address generation/modification resource 56 is configured for setting the first three most significant bits of the protocol identifier 32 to zero ("000"): according to IPv6 protocol, the first three most significant bits of an IPv6 address must not be zero; hence, the presence of zeros in the first three most significant bits enables the door mobile router 20b to identify the protocol identifier 32.

Hence, the IPv6 tag address 30 generated by the tag address generation/modification resource 56 serves as the care of address for the mobile router 20a while the mobile router 20a is attached to the IPv4 network 14 instead of an IPv6 attachment router.

As shown in FIG. 2, the mobile router 20 also includes a header generation and parser resource 58, which includes a reverse routing header (RRH) resource 66. The resource 58 is configured for generating an IPv6 header according to mobile IPv6 protocol, and the reverse routing header resource 66 is configured for adding to the IPv6 header a reverse routing header, illustrated in FIG. 5. The mobile router 20 also includes a binding update resource 60 configured for sending a binding update message to its corresponding home agent 24 in response to attaching to a network, in this case a private IPv4 network 14a. The mobile router 20 also includes a source routing resource 62 configured for routing received IPv6 packets having routing headers according to Mobile IPv6 Protocol and as specified by the Internet Draft by Thubert et al., described below.

Figure 5:
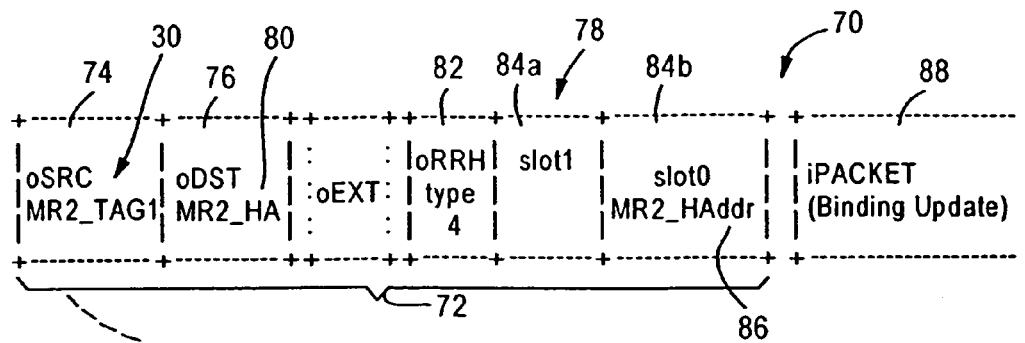
FIG. 5 is a diagram illustrating reverse routing header operations by the IPv4 tunnel endpoints, according to an embodiment of the present invention.
Figure 5:
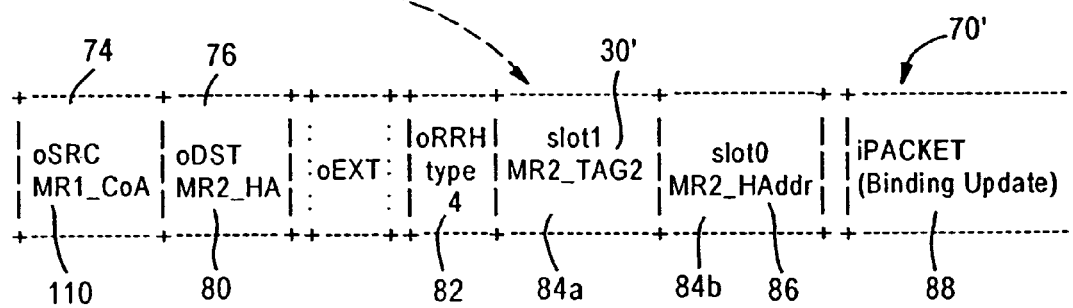

FIG. 5 is a diagram illustrating an IPv6 packet 70, for example a binding update message, generated by the header generation and parser resource 58 and the binding update resource 60, for delivery to the home agent 24. The IPv6 packet 70 includes an IPv6 header 72, generated by the header generation and parser resource 58, that includes a source address field 74, a destination address field 76, and a reverse routing header (RRH) 78 generated by the RRH resource 66. The IPv6 packet 70 also includes the payload 88, for example a binding update message. The source address field 74 specifies the tag address ("MR2_TAG1") 30 for the mobile router 20a, and the destination address field 76 specifies the IPv6 home agent address ("MR2_HA") 80 for the home agent 24.

The reverse routing header 78 generated by the RRH resource 66 includes a routing header type field 82 that specifies the type of routing header ("type 4"), and slots 84a and 84b for storing routing information. In particular, the RRH resource 66 inserts in slot 84b ("slot0") the home address 86 for the mobile router (MR2) 20a that initiated the IPv6 tunnel 28. The RRH resource 66 also includes an empty slot 84a ("slot1") to enable the door mobile router 20b to insert a modified IPv6 tag (MR2_TAG2) 30' for generation of a modified IPv6 packet 70' to be output to the home agent 24 via the IPv6 network 16.

The reverse routing header 78 illustrates the case of the mobile router 20a (MR2) establishing the tunnel 28 with its corresponding home agent 24. In the case of the mobile router 20c (MR3) establishing a tunnel with its own home agent (not shown), the mobile router 20c would generate a reverse routing header having three slots 84 (e.g., slot0, slot1, and slot2), where the initial slot (slot0) would specify the home address (e.g., MR3_HAddr) of the originating mobile router establishing the tunnel, in this case MR3. Hence, the mobile router 20a (MR2) would receive from the mobile router 20c (MR3) an IPv6 packet having a source address field specifying the care-of address (e.g., MR3_CoA) of the mobile router (MR3) and a reverse routing header specifying the home address (MR3_HAddr) in the initial slot (slot0). In this case, the mobile router 20a (MR2) would update the reverse routing header by inserting the care of address (MR3_CoA) into the next available slot (slot1), and overwriting the source address field 74 with its tag address value (MR2_TAG1) 30.

Referring back to the example illustrated in FIG. 5, where the mobile router 20a (MR2) establishes the tunnel 28 with its corresponding agent and generates the reverse routing header with two slots 84a and 84b: once the tag address generation/modification resource 56 in the mobile router 20a generates the IPv6 tag address 30 and the header generator 58 generates the IPv6 header 72 for the corresponding payload 88, the encapsulation decapsulation resource 54 encapsulates the IPv6 packet 70 into an IPv4 packet 90, illustrated in FIG. 4. The IPv4 packet 90 includes an IP header having a source address field 92 specifying the private IPv4 "Care-of Address" (e.g., "10.1.1.2") 34 of the mobile router 20a, and a destination address field 94 specifying the public IPv4 gateway address (e.g., "210.0.2.2") 36 of the door mobile router 20b. The IPv4 packet 90 also includes a transport header 95 that includes a source UDP port field 96 specifying a source UDP address (illustrated as "XX") 38, and a destination UDP port field 98 specifying the prescribed door port 40, in this case the known mobile IP port "434". The encapsulation/decapsulation resource 54 of FIG. 2 supplies the IPv4 packet 90 to an IPv4 interface 100 configured for outputting the IPv4 packet 90 onto the IPv4 network 14 according to IPv4 protocol.

As illustrated in FIG. 4, the traversal of the IPv4 packet 90 via the NAT 16 from the private network 14a to the public network 14b causes the NAT/PAT 16 to modify the IPv4 packet 90 into a translated packet 90'. In particular, the NAT/PAT 16 translates the values 34 and 38 in the source address field 92 and the source port field 96 with a public IPv4 address value (e.g., "66.88.1.2") 102 and a public port (illustrated as "YY") 104, respectively. Hence, the door mobile router 20b receives the translated packet 90' via the public IPv4 network 14b.

The door mobile router 20b is configured to recognize itself as being a door mobile router configured for sending IPv6 packets between the IPv6 network 16 and the IPv4 network 14. Hence, the IPv4 interface 100 of the door mobile router 20b of FIG. 2 is configured for forwarding the translated packet 90' to the encapsulation/decapsulation resource 54 in response to detecting the prescribed public gateway UDP port 40 having the value "434" in the destination port field 98. The resource 54 decapsulates the IPv6 packet 70 by stripping off the IPv4 header, and forwarding the IPv6 packet 70 to the IPv6 module 50.

The header generation and parser resource 58 parses the IPv6 header 72, illustrated in FIG. 5. In response to detecting the "up" protocol identifier 32 in the IPv6 tag address 30 in the source address field 74, the header generation and parser resource 58 issues a function call to the tag address generation/modification resource 56 to modify the IPv6 tag address 30 by overwriting the "up" protocol identifier 32 with a "down" protocol identifier (e.g., "12.34.32.10") 106, illustrated in FIG. 3B. As described below, the "down" protocol identifier 106 is used to enable the door mobile router 20b to automatically initiate the protocol of forwarding the IPv6 packet, received "down" from the home agent, to the destination via the IPv4 network 14. In addition, the protocol identifier 106 has the first three most significant bits set to "000" to ensure that the modified IPv6 tag address 30' is not misinterpreted as an IPv6 address.

As illustrated in FIG. 3B, the modification resource 56 also overwrites the private source IP address 34 and the private source UDP port 38 specified in the IPv6 tag address 30 with the respective translated public values 102 and 104, resulting in a modified IPv6 tag address 30' that specifies a down protocol identifier 106, the public IPv4 address ("66.88.1.2") 102 of the mobile router 20a, the public UDP port ("YY") 104 of the mobile router 20a, and the public IP address 36 and UDP port 40 for the door mobile router 20b. Hence, the modified IPv6 tag address 30' includes all parameters necessary for the door mobile router 20b to encapsulate an IPv6 packet to be forwarded to the mobile router 20a via the IPv4 network 14.

As illustrated with respect to FIG. 5, the reverse routing header resource 66 in the door mobile router 20b inserts the modified IPv6 tag address (MR2_TAG2) 30' into the empty slot 84a of the reverse routing header 78, and inserts its own care-of address (MR1_CoA) 110 into the source address field 74, resulting in the modified IPv6 packet 70'. The IPv6 interface 64 of the door mobile router 20b outputs the modified IPv6 packet 70' to the home agent 24 via the IPv6 network 16, as specified in the above-incorporated Internet Draft by Thubert et al. As described above, if the reverse routing header was initially generated by the mobile router 20c, the door mobile router 20b would insert the modified IPv6 tag address into the next available slot of the reverse routing header, and forward the IPv6 packet as specified by the destination address field.

The home agent 24 receives the modified IPv6 packet 70' in response to detecting the home agent address value (M2_HA) 80 in the destination address field 76. In response to receiving the modified IPv6 packet 70', the home agent 24 reads the bottom entry 84b of the reverse routing header 78 to identify the home address 86 of the mobile router 20a, using the entry as if it was a mobile IPv6 home address destination option (i.e., as an index into the binding cache). The home agent 24 can then identify the binding update request 88, and store the modified tag address 30' as the "care of address" for the mobile router 20a in its corresponding binding cache entry. Hence, the traversal of the IPv4 network 14 can be transparent to the home agent 24.

Figure 6:
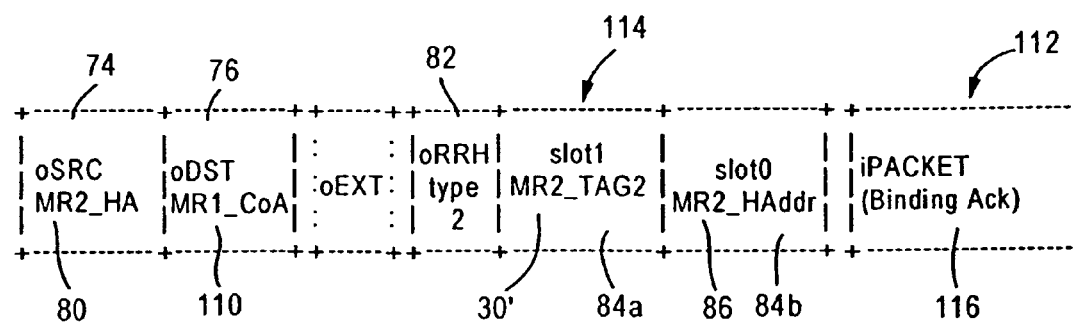
FIG. 6 is a diagram illustrating a type 2 routing header, received by the destination mobile router of FIG. 1, from the home agent of the source mobile router.

As shown in FIG. 6, the home agent 24 now can send a packet 112 directly back via the tunnel 28 by using the reverse routing header 78 (specifying the modified tag 30') and the source address 110 in building the routing header. Also note that the home agent 24 can use the reverse routing header to send a packet via the tunnel 28, in the event a binding cache entry does not yet exist for the mobile router, or if the packet is sourced at the care-of address. As specified by the above-incorporated Internet Draft by Thubert et al., the home agent 24 inserts its home agent IPv6 address (e.g., "MR2_HA") 80 in the source address field 74, and the care of address for the door mobile router ("MR1_CoA") 110 in the destination address field 76. The home agent 24 also inserts a type 2 routing header 114 that includes a routing header type field 82 that specifies the type of routing header ("type 2"), and slots 84a and 84b for storing the modified tag address 30' and the home address 86 for the mobile router 20a, respectively. The home agent 24 then outputs onto the IPv6 network 16 the packet 112 that includes the binding acknowledgment payload 116.

The door mobile router 20b, in response to receiving the IPv6 packet 112 from the home agent 24, uses its header generation and parser resource 58 to parse the routing header 114. In response to detecting the "down" protocol identifier 106 in the modified IPv6 tag address 30', the door mobile router 20b performs conventional IPv6 source routing by decrementing the segments left field (not shown) in the routing header 114, and updating the destination address field 76 with the modified tag address 30' in the header field 84a. The door mobile router 20*b* utilizes its encapsulation/decapsulation resource 54 to generate an IPv4 header that specifies the public address 102 and public port 104 of the mobile router 20*a* in the respective destination headers. The IPv4 interface 100 outputs the packet onto the bidirectional tunnel 13.

The packet, having been translated by the NAT/PAT 16, specifies the private IP address 34 and the private UDP port 38 in the destination address and destination port fields, respectively. The mobile router 20*a* can then recover the IPv6 packet 112 based on identifying the source UDP port specifying the public door UDP value 40.

Figure 7A:
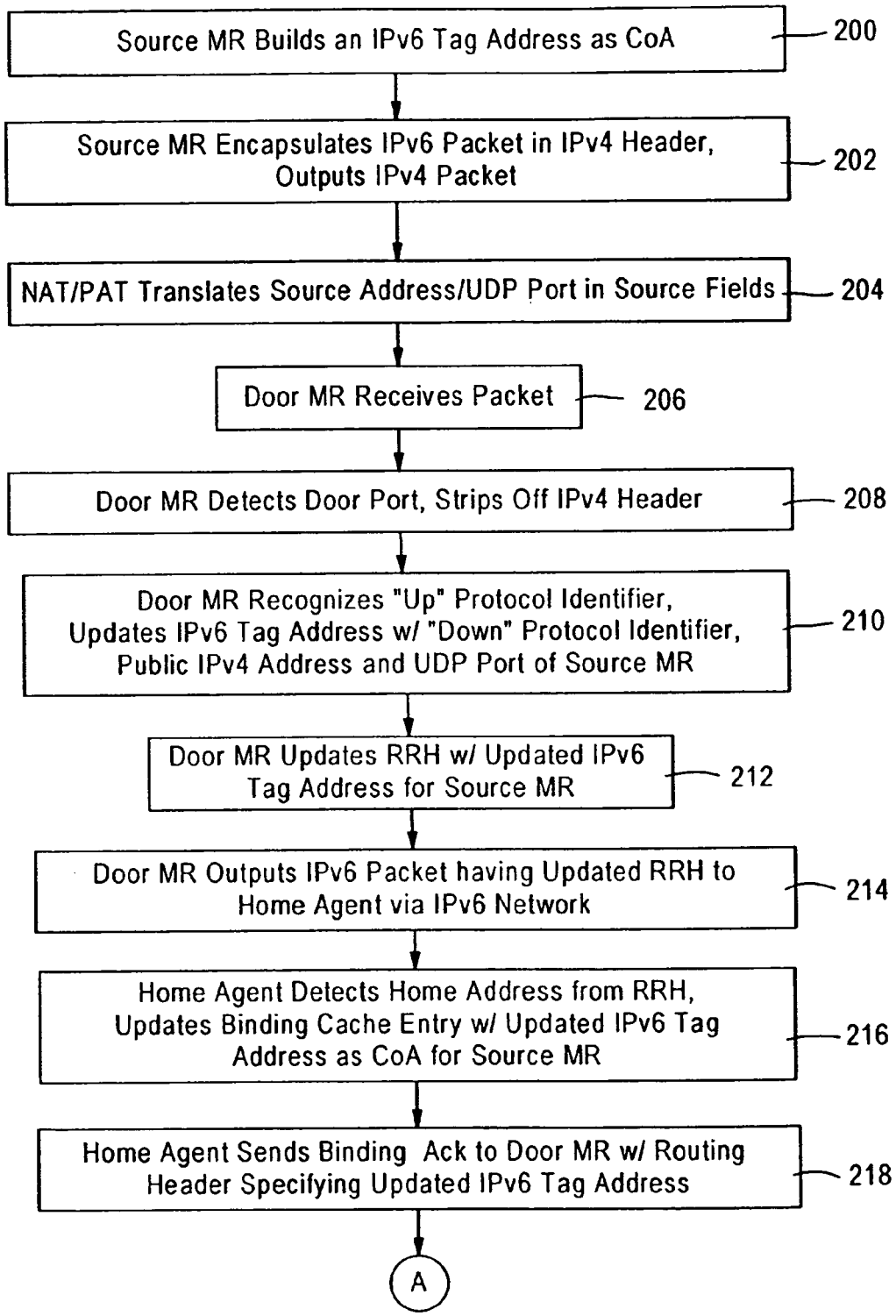
FIGS. 7A and 7B are a flow diagrams summarizing the method of tunneling IPv6 packets across an IPv4 network, according to an embodiment of the present invention.
Figure 7B:
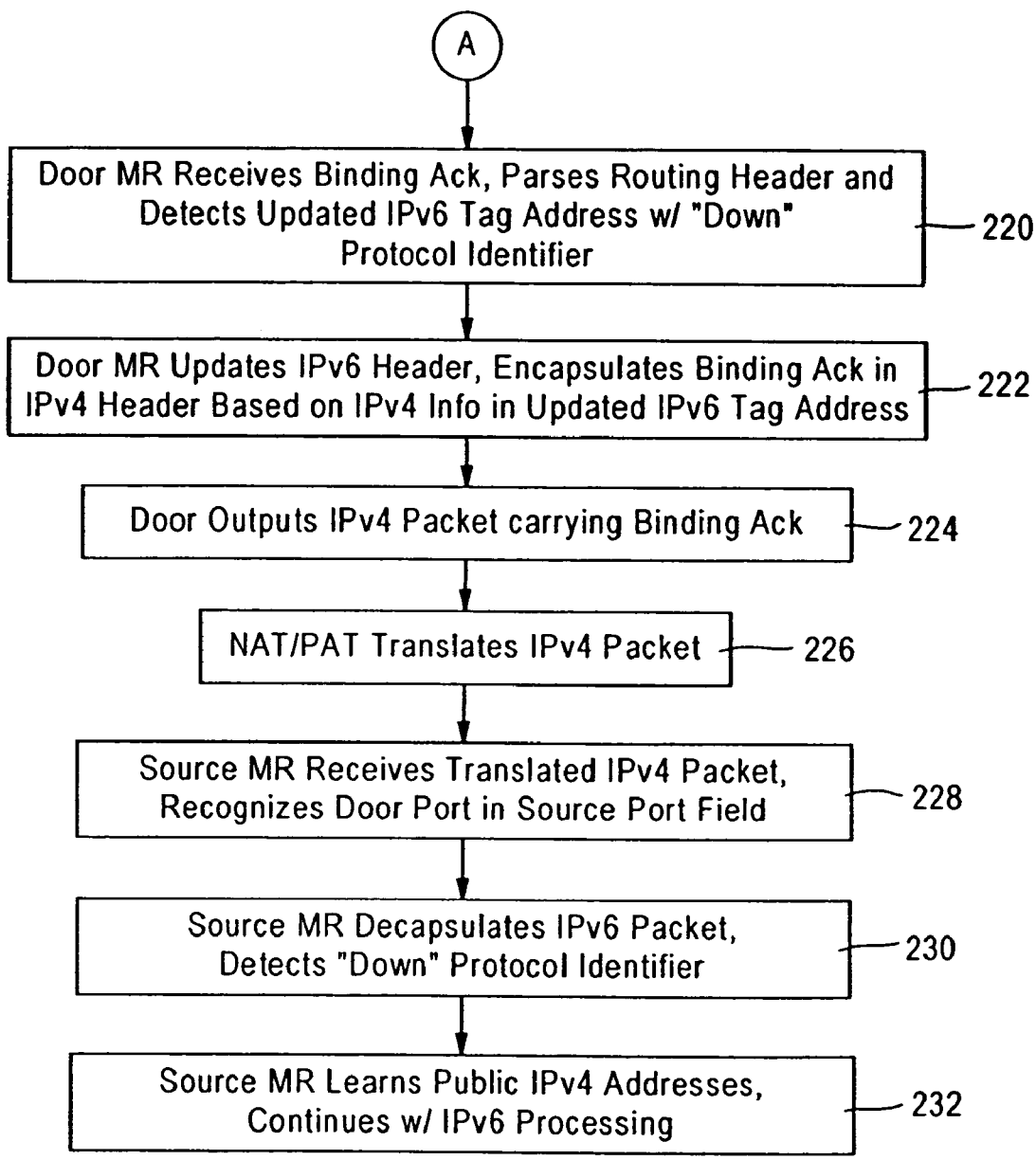

FIGS. 7A and 7B are diagrams illustrating the method of sending IPv6 packets via an IPv4 tunnel according to an embodiment of the present invention. The steps described herein with respect to FIGS. 7A and 7B can be implemented in the respective mobile routers as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method begins in step 200, where the tag address generation resource 56 of the source mobile router 20*a* builds the IPv6 tag address 30 as its care of address. The encapsulation/decapsulation resource 54 of the source mobile router 20*a* encapsulates in step 202 the IPv6 packet 70 in an IPv4 header, and outputs the IPv4 packet 90 onto the private IPv4 network 14*a*. The NAT/PAT 16 translates in step 204 the private source address 34 and private UDP port 38 from the source address field 92 and the source port field 96 into the public IP address 102 and the public port 104, respectively, and outputs the translated IPv4 packet 90'.

The door mobile router 20*b* receives in step 206 the translated IPv4 packet 90'. The IPv4 interface 100 of the door mobile router 20*b* detects in step 208 the door port value ("434") 40 specifying mobile IP, and in response the encapsulation/decapsulation resource 54 strips the IPv4 header. The header generation and parser resource 58 of the door mobile router 20*b* detects in step 210 the "up" protocol identifier 32 in the IPv6 tag address 30, and in response the tag modification resource 56 updates the IPv6 tag address 30 with the "down" protocol identifier 106, and overwrites the private addresses 34 and 38 of the source MR 20*a* with the public addresses 102 and 104, respectively. The RRH resource 66 of the door mobile router 20*b* updates in step 212 the reverse routing header with the updated IPv6 tag address 30'. The IPv6 interface 64 of the door mobile router 20*b* outputs in step 214 the modified IPv6 packet 70' to the home agent 24 via the IPv6 network 16.

The home agent 24 detects in step 216 the home address 86 of the source mobile router 20*a* from slot 84*b* of the reverse routing header, and responds to the binding update 88 by updating the binding cache entry for the source mobile router 20*a* to specify the updated IPv6 tag address (MR2_TAG2) 30' as the care of address for the source mobile router 20*a*. The home agent outputs in step 218 the binding acknowledgment 112 that includes the routing header 114 specifying the updated IPv6 tag address 30'.

Referring to FIG. 7B, the door mobile router 20*b* receives in step 220 the binding acknowledgment message 112 of FIG. 6. The parser resource 58 of the door mobile router 20*b* parses the routing header 114 and detects the updated IPv6 tag address 30' that specifies the "down" protocol identifier 106.

The door mobile router 20*b* responds to the "down" protocol identifier 106 by updating in step 222 the routing header 114, as specified by the Internet Draft by Thubert et al., and encapsulating the binding acknowledgment message 112 in an IPv4 header based on the public address 102 and the public port 104 specified for the source mobile router 20*a*. The door mobile router 20*b* outputs in step 224 the IPv4 packet carrying the binding acknowledgment 112.

After the NAT/PAT 16 translates the destination public address 102 and the destination public port 104 of the mobile router 20*a* to the respective private address 34 and private port 38 in step 226, the source mobile router 20*a* receives the translated IPv4 packet in step 228. The IPv4 interface 100 of the source mobile router 20*a* recognizes the prescribed door port 40 in the source port field, and in response the encapsulation/decapsulation resource 54 of the source mobile router 20*a* decapsulates the IPv6 packet 112 in step 230.

In response to detecting the "down" protocol identifier 106 in step 230, the source mobile router learns the public IPv4 addresses specified in the updated tag address 30' in step 232, and reintroduces the IPv6 packet into the IPv6 fabric; in this case, the binding acknowledgment 116 is logged by the binding update resource 60 in the source mobile router 20*a*. Alternatively, if the received IPv6 packet is destined to another mobile node such as the mobile router 20*c* or the mobile host 22, the mobile router 20*a* forwards the IPv6 packet according to mobile IPv6 protocol.

According to the disclosed embodiment, IPv6 mobile routers can efficiently establish tunnels across an IPv4 network for transfer of IPv6 packets, regardless of whether the IPv4 network utilizes symmetric NATs. The IPv4 tunnel is always started by the MR sending the binding update: hence, the IPv4 tunnel is always available because the MR knows that it has its own tunnel at any point in time. If the binding update is sent often enough for the resource to maintain the path, then the path will remain active simply by default execution of Mobile IP protocol by the MR. Hence, the IPv4 tunnel is always active with no extra processing resource cost.

In addition, there is no need for the door mobile router to maintain any state, or store any information about the mobile router roaming through it, because all the necessary IPv4 routing information is in the packet. Further, the IPv4 routing information is stored in the binding cache of the home agent. Hence, when the IPv4 routing information is no longer valid, the binding cache is automatically cleared by the home agent, eliminating the possibility of any invalid state in the IPv6 network. Hence there is no need to remove obsolete information in the network due to an invalid state (e.g., in a gateway, server, etc.).

Further, the IPv4 tunnel from the MR to the door via the NAT uses the same UDP port—hence, a single resource in the NAT/PAT can be used for all the mobile routers which are attached to the TLMR 20*a*, eliminating the use of multiple resources in the NAT/PAT. Note that if the network does not have a PAT such that no transport header values are necessary for the tunnel 13, the UDP source and door port values 38 and 40 can be zeroed out the port fields in the tag 30.

Further, the source MR 20*a* may easily switch to a new "door": the next packet output by the source MR 20*a* takes the next source route, which updates the binding cache in the home agent, causing the home agent to use the new door. Note that the home agent does not even need to wait for a binding update, since it can merely use the reverse routing header.

Different variations and modifications also may be deployed, as described below. In particular, the door (i.e., IPv4/IPv6 gateway) is assumed to be separate from the home agent; hence, when the packet is received, the door forwards the packet through the IPv6 interface by inserting the synthesized IPv6 tag address into the reverse routing header. However if the IPv6 gateway was the home agent, the IPv6 source address of the packet would have ended up in the binding cache.

Hence, a home agent can be configured to send to the care-of address using the UDP encapsulation. Hence, a mobile router that does not have RRH capabilities can build the same type of IPv6 tag address, insert the IPv6 tag address in the source address field of the IPv6 header (home address specified in the destination option field), output the packet via an IPv4 tunnel without an RRH to its home agent. The home agent terminates the IPv4 tunnel (i.e., the home agent serves as the door), recovers the IPv6 packet and updates the binding cache having the tag representing the care-of address. So the home agent, upon accessing the binding cache entry and detecting the tag, forwards any packet in an encapsulated UDP packet. Since the "tag" (representing the Care-of Address) cannot be used as a source or destination, the home agent and the "door" must be co-located. This actually may be beneficial for smaller implementations.

Another variation involves a protocol known as Hierarchical Mobile IP (HMIP). See the Internet Draft by Soliman, entitled "Hierarchical MIPv6 mobility management (HMIPv6)", July 2002, available at http://www.nal.motlabs.com/nemo/drafts/draft-ietf-mobileip-hmipv6-06.txt (the disclosure of which is incorporated in its entirety herein by reference). In particular, a roaming mobile node (in particular, a mobile host (MH)) interacts with a mobility anchor point (MAP), which registers with the MH's home agent on behalf of the MH. When the MH roams around the same MAP, the MH does not need to change its registration because the MAP can continue to forward packets to the MH. Hence, the MAP could be the door. The MAP has its own IPv6 address, hence it can be distinct from the home agent. The MAP also has an IPv4 address, so if the MH knows the MAP IPv4 address, the MH can build its IPv6 tag address based on the MAP IPv4 address, and forward the IPv6 packet carrying the IPv6 tag address via the associated IPv4 tunnel; the MAP registers on behalf of the MH with the home agent of the MH, with the IPv6 address of the MAP acting as the Care-of address of the MH (e.g, like a proxy).

Hence, in the case of a mobile node (in particular, a mobile host) that does not use a reverse routing header, HMIP allows the topology to be distributed between different home agents and different doors. The doors would actually use HMIP to register the MH.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An IPv6 mobile router comprising:
a first resource configured for generating an IPv6 tag address that includes a prescribed protocol identifier for an IPv6 gateway configured for transferring packets between an IPv4 network and an IPv6 network, and a public IPv4 gateway address for the IPv6 gateway;
a second resource configured for generating an IPv6 header for an IPv6 packet, the IPv6 header having a source address field that specifies the IPv6 tag address, and a reverse routing header that specifies a home address;
a third resource configured for encapsulating the IPv6 packet in an IPv4 packet having an IPv4 header including a destination address field that specifies the public gateway IPv4 address, and a source address field specifying a mobile router IPv4 address, the mobile router IPv4 address used by the IPv6 mobile router for accessing the IPv6 gateway via the IPv4 network; and
a fourth resource configured for outputting the IPv4 packet to the IPv6 gateway via the IPv4 network, for transfer of the IPv6 packet onto the IPv6 network.

2. The mobile router of claim 1, wherein the first resource is configured for:
setting the first three bits of prescribed protocol identifier to a value of "000", and starting the IPv6 tag address with the prescribed protocol identifier; and
inserting the mobile router IPv4 address in the IPv6 tag address.

3. The mobile router of claim 1, wherein the IPv6 mobile router has a prescribed home agent having a corresponding home agent address, the second resource configured for specifying the home agent address within a destination address field of the IPv6 packet.

4. The mobile router of claim 3, wherein the second resource is configured for adding at least one empty slot for the IPv6 gateway to insert the IPv6 tag prior to forwarding the IPv6 packet to the home agent.

5. The mobile router of claim 4, further comprising a binding update resource configured for adding a binding update within the IPv6 packet for the prescribed home agent based on the IPv6 mobile router having attached to the IPv4 network.

6. The mobile router of claim 1, wherein:
the first resource is configured for inserting within the IPv6 tag address a prescribed public gateway port for the IPv6 gateway;
the third resource is configured for inserting within the IPv4 packet a transport header having a destination port field specifying the prescribed public gateway port, and a source port field specifying a mobile router port, the mobile router port used by the IPv6 mobile router for accessing the IPv6 gateway via the IPv4 network.

7. The mobile router of claim 6, wherein:
the fourth resource is configured for receiving from the IPv4 network a second IPv4 packet having a source address field specifying the public gateway IPv4 address, a source port field specifying the prescribed public gateway port, a destination address field specifying the mobile router IPv4 address, and a destination port field specifying the mobile router port;
the third resource is configured for unencapsulating a second IPv6 packet from the second IPv4 packet in response to detecting the source port field specifies the prescribed public gateway port; and
the second resource is configured for detecting within a destination address field of the second IPv6 packet a second IPv6 tag address that specifies a public IPv4 address distinct from the mobile router IPv4 address, a public port distinct from the mobile router port, and a second prescribed protocol identifier indicating that the public IPv4 address and the public port correspond to the mobile router IPv4 address and the mobile router port specified in the IPv4 packet.

8. The mobile router of claim 7, further comprising a fifth resource configured for selectively source routing the second IPv6 packet in a second IPv6 network based on detecting a type 2 routing header specifying another destination.

9. The mobile router of claim 8, wherein the mobile router IPv4 address is a private IP address and the mobile router port is a private port, the outputting fourth resource configured for outputting and receiving the respective IPv4 packet and the second IPv4 packet via a network address translator (NAT) having a port address translator (PAT).

10. An IPv6 mobile router comprising:
an IPv6 resource configured for outputting an IPv6 packet, wherein:
(1) the IPv6 resource is configured for generating an IPv6 tag address, the IPv6 tag address including a prescribed protocol identifier for an IPv6 gateway configured for transferring packets between an IPv4 network and an IPv6 network, and a public IPv4 gateway address for the IPv6 gateway, and
(2) the IPv6 resource is configured for generating an IPv6 header for the IPv6 packet, the IPv6 header having a source address field that specifies the IPv6 tag address, and a reverse routing header that specifies a home address;
an encapsulation resource configured for encapsulating the IPv6 packet into an IPv4 packet having an IPv4 header including a destination address field that specifies the public gateway IPv4 address, and a source address field specifying a mobile router IPv4 address, the mobile router IPv4 address used by the IPv6 mobile router for accessing the IPv6 gateway via the IPv4 network; and
an IPv4 interface configured for outputting the IPv4 packet to the IPv6 gateway via the IPv4 network, for transfer of the IPv6 packet onto the IPv6 network.

11. The mobile router of claim 10, wherein the IPv6 resource is configured for:
setting the first three bits of prescribed protocol identifier to a value of "000", and starting the IPv6 tag address with the prescribed protocol identifier; and
inserting the mobile router IPv4 address in the IPv6 tag address.

12. The mobile router of claim 10, wherein the IPv6 mobile router has a prescribed home agent having a corresponding home agent address, the IPv6 resource configured for specifying the home agent address within a destination address field of the IPv6 packet.

13. The mobile router of claim 12, wherein the IPv6 resource is configured for adding at least one empty slot for the IPv6 gateway to insert the IPv6 tag prior to forwarding the IPv6 packet to the home agent.

14. The mobile router of claim 13, wherein the IPv6 resource is configured for adding a binding update within the IPv6 packet for the prescribed home agent based on the IPv6 mobile router having attached to the IPv4 network.

15. The mobile router of claim 10, wherein:
the IPv6 resource is configured for inserting within the IPv6 tag address a prescribed public gateway port for the IPv6 gateway;
the encapsulation resource is configured for inserting within the IPv4 packet a transport header having a destination port field specifying the prescribed public gateway port, and a source port field specifying a mobile router port, the mobile router port used by the IPv6 mobile router for accessing the IPv6 gateway via the IPv4 network.

16. The mobile router of claim 15, wherein:
the IPv4 interface is configured for receiving from the IPv4 network a second IPv4 packet having a source address field specifying the public gateway IPv4 address, a source port field specifying the prescribed public gateway port, a destination address field specifying the mobile router IPv4 address, and a destination port field specifying the mobile router port;
the encapsulation resource configured for unencapsulating a second IPv6 packet from the second IPv4 packet in response to detecting the source port field specifies the prescribed public gateway port; and
the IPv6 resource configured for detecting within a destination address field of the second IPv6 packet a second IPv6 tag address that specifies a public IPv4 address distinct from the mobile router IPv4 address, a public port distinct from the mobile router port, and a second prescribed protocol identifier indicating that the public IPv4 address and the public port correspond to the mobile router IPv4 address and the mobile router port specified in the IPv4 packet.

17. The mobile router of claim 16, wherein the IPv6 resource is configured for selectively source routing the second IPv6 packet in a second IPv6 network based on detecting a type 2 routing header specifying another destination.

18. The mobile router of claim 17, wherein the mobile router IPv4 address is a private IP address and the mobile router port is a private port, the IPv4 interface configured for outputting and receiving the respective IPv4 packet and the second IPv4 packet via a network address translator (NAT) having a port address translator (PAT).

19. An IPv6 mobile router including:
an IPv4 resource configured for attaching to a public IPv4 network using a public IPv4 gateway address, the IPv4 interface configured for receiving from the public IPv4 network an IPv4 packet having a destination address specifying the public IPv4 gateway address, a destination port field specifying a prescribed public gateway port, a source address field specifying a pubic IPv4 address and a source port field specifying a public port;
an encapsulation/decapsulation resource configured for recovering an IPv6 packet from the IPv4 packet based on the prescribed public gateway port specified in the destination port field; and
an IPv6 resource, wherein
(1) the IPv6 resource is configured for modifying a detected IPv6 tag address in a source address field of the IPv6 packet into a modified IPv6 tag address based on the IPv6 tag address specifying a prescribed protocol identifier for an IPv6 gateway to transfer the IPv6 packet from the IPv4 network to the IPv6 network, the IPv6 resource configured for replacing the prescribed protocol identifier with a second protocol identifier, and inserting the pubic IPv4 address and the public port,
(2) the IPv6 resource is configured for updating the IPv6 packet into an updated IPv6 packet by inserting the modified IPv6 tag address into a detected reverse routing header of the IPv6 packet, and inserting a care-of address for the mobile router into the source address field,
(3) the IPv6 resource configured for outputting the updated IPv6 packet onto an IPv6 network.

20. The mobile router of claim 19, wherein the IPv6 resource configured for detecting the prescribed protocol identifier at a start of the IPv6 tag address based on the first three bits having a value of "000", the IPv6 resource configured for overwriting an IPv4 address and UDP port value in the IPv6 tag address with the public IPv4 address and the public port, respectively.

21. The mobile router of claim 20, wherein the IPv6 resource is configured for setting the first three bits of the second protocol identifier to "000", and routing a second received IPv6 packet, received from the IPv6 network and specifying the second protocol identifier, to the IPv4 network in response to detecting the second protocol identifier.

22. The mobile router of claim 19, wherein the IPv6 resource is configured for detecting the reverse routing header based on detecting a router type option field specifying a corresponding prescribed router type option value, and inserting the modified IPv6 tag address into a detected empty slot of the reverse routing header.

23. The mobile router of claim 19, wherein the prescribed public gateway port has a UDP value of "434" specifying mobile IP.

24. The mobile router of claim 19, wherein the IPv4 address and port value in the IPv6 tag address specify a private IP address and a private port, respectively, having been translated to the respective public IPv4 address and the public port by a NAT.

25. The mobile router of claim 19, wherein:
the IPv6 resource is configured for receiving via the IPv6 network a second IPv6 packet having a routing header that specifies the modified IPv6 tag address;
the IPv6 resource configured for detecting the second protocol identifier, the public IPv4 address and the public port in the modified IPv6 tag address, and modifying the IPv6 packet into a forwarded IPv6 packet by inserting the modified IPv6 tag address into the destination address field of the IPv6 packet;
the encapsulation/decapsulation resource configured for encapsulating the forwarded IPv6 packet in a second IPv4 packet having a destination address field specifying the public IPv4 address and a port field specifying the public port; and
the IPv4 resource configured for outputting the second IPv4 packet onto the IPv4 network.

\* \* \* \* \*